(12) United States Patent
Jacobs et al.

(10) Patent No.: US 10,949,365 B2
(45) Date of Patent: Mar. 16, 2021

(54) SOFTWARE-DEFINED DEVICE INTERFACE SYSTEM AND METHOD

(71) Applicant: IoT.nxt BV, The Hague (NL)

(72) Inventors: Gysbert Johannes Jacobs, Centurion (ZA); Rudi Deodat Du Toit, Monument Park (ZA)

(73) Assignee: IOT.nxt BV, The Hague (NL)

( * ) Notice: Subject to any disclaimer, the term of this patent is extended or adjusted under 35 U.S.C. 154(b) by 0 days.

(21) Appl. No.: 16/330,677

(22) PCT Filed: Sep. 5, 2017

(86) PCT No.: PCT/IB2017/055324
§ 371 (c)(1),
(2) Date: Mar. 5, 2019

(87) PCT Pub. No.: WO2018/042402
PCT Pub. Date: Mar. 8, 2018

(65) Prior Publication Data
US 2019/0213152 A1    Jul. 11, 2019

(30) Foreign Application Priority Data
Sep. 5, 2016   (ZA) ................................. 2016/06120

(51) Int. Cl.
*G06F 13/20*        (2006.01)
*G06F 1/08*         (2006.01)
(Continued)

(52) U.S. Cl.
CPC ............... *G06F 13/20* (2013.01); *G06F 1/04* (2013.01); *G06F 1/08* (2013.01); *G06F 5/16* (2013.01);
(Continued)

(58) Field of Classification Search
None
See application file for complete search history.

(56) References Cited

U.S. PATENT DOCUMENTS 7,185,138 B1 * 2/2007 Galicki ................... H04L 49/15
                                                   710/316
8,117,587 B1   2/2012 Testardi
                 (Continued)

FOREIGN PATENT DOCUMENTS

WO    WO-88/10028 A1    12/1988

OTHER PUBLICATIONS

International Search Report and Written Opinion for International Application No. PCT/IB2017/055324, dated Jan. 4, 2018.
(Continued)

*Primary Examiner* — Henry Tsai
*Assistant Examiner* — Christopher A Bartels
(74) *Attorney, Agent, or Firm* — Foley Hoag LLP; Rajesh Vallabh (57) ABSTRACT

The invention relates to a software defined device interface system 10, a software defined device interface, gateway and a method of defining an interface for a device which uses a specific communication protocol for communication purposes. The system 10 includes a microprocessor/processing unit 12.1, 12.2 with a plurality of communication pins and software/firmware. The software/firmware is configured, based on a specific communication protocol which is used by a particular device 30.1-30.4 for communication purposes, to, in runtime, assign/select one or more of the communication pins to form a virtual port to which the particular device 30.1-30.4 can be connected, upon receiving a configuration instruction from a user to implement the specific communication protocol. The software/firmware is further configured to implement the specific communication protocol through the virtual port, to thereby allow for communication between the microprocessor/processing unit 12.1, 12.2 and the device 30.1-30.4, when the device 30.1-30.4 is connected to the pin(s) of the virtual port.

12 Claims, 10 Drawing Sheets

(51) Int. Cl.
    *G06F 15/78*     (2006.01)
    *G06F 5/16*     (2006.01)
    *G06F 15/00*     (2006.01)
    *G06F 1/04*     (2006.01)
    *H04L 29/08*     (2006.01)
    *G06F 21/76*     (2013.01)
    *G06F 21/85*     (2013.01)
    *H04L 29/06*     (2006.01)
    *G06F 13/42*     (2006.01)

(52) U.S. Cl.
    CPC .............. *G06F 13/42* (2013.01); *G06F 15/00* (2013.01); *G06F 15/7817* (2013.01); *G06F 21/76* (2013.01); *G06F 21/85* (2013.01); *H04L 67/34* (2013.01); *H04L 69/18* (2013.01); *G06F 2213/40* (2013.01); *H04L 67/12* (2013.01)

(56) References Cited

U.S. PATENT DOCUMENTS

| | | | |
|---|---|---|---|
| 2008/0058964 A1* | 3/2008 | Nickerson | A01G 25/167 700/19 |
| 2009/0088885 A1 | 4/2009 | Yuan et al. | |
| 2009/0138732 A1* | 5/2009 | Chang | H04B 3/54 713/300 |
| 2010/0238003 A1* | 9/2010 | Chan | H04L 12/40039 340/538 |
| 2013/0080677 A1 | 3/2013 | Simmons | |
| 2014/0292531 A1* | 10/2014 | Whitson, Jr. | H04L 67/12 340/870.02 |
| 2014/0292532 A1* | 10/2014 | Whitson, Jr. | H04Q 9/00 340/870.02 |
| 2015/0131485 A1 | 5/2015 | Brandt et al. | |
| 2015/0187209 A1 | 7/2015 | Brandt | |
| 2015/0277778 A1 | 10/2015 | Adams et al. | |
| 2015/0363012 A1 | 12/2015 | Sundara-Rajan et al. | |
| 2016/0224489 A1 | 8/2016 | Mishra et al. | |
| 2016/0275034 A1* | 9/2016 | Chang | G06F 13/4027 |
| 2017/0039162 A1* | 2/2017 | Mishra | G06F 13/4282 |
| 2017/0116103 A1* | 4/2017 | Cencini | G06F 11/3055 |
| 2017/0220502 A1* | 8/2017 | Kessler | G06F 13/404 |
| 2017/0228327 A1* | 8/2017 | Mishra | G06F 13/161 |
| 2018/0096971 A1* | 4/2018 | Pappu | H01L 25/0657 |
| 2018/0096979 A1* | 4/2018 | Pappu | H01L 22/32 |
| 2018/0225230 A1* | 8/2018 | Litichever | G06F 21/56 |
| 2019/0103914 A1* | 4/2019 | Junk | G05B 19/4186 |
| 2019/0213152 A1* | 7/2019 | Jacobs | G06F 1/08 |
| 2020/0106743 A1* | 4/2020 | Park | H04L 63/0245 |

OTHER PUBLICATIONS

Extended European Search Report for EP Application No. 1784561.3 dated Feb. 5, 2020.

\* cited by examiner

SOFTWARE-DEFINED DEVICE INTERFACE SYSTEM AND METHOD

FIELD OF THE INVENTION

The invention relates to a software defined device interface system, a software defined device interface, gateway and a method of defining an interface for a device which uses a specific communication protocol for communication purposes.

BACKGROUND

The "Internet of Things" (IoT) is a technical term in the IT industry, where billions of devices are going to be connected to various Internet servers/Cloud Services. Although a portion of devices are sufficiently intelligent (for example IP based), and can be directly connected to the cloud, there are a lot of legacy or potential new low cost devices that can be connected ("digitised") onto an IP based platform, via an edge gateway.

Currently it is believed by the Inventor that IoT could be implemented in the following markets:
1. Consumers (Home Automation);
2. Commercial (Examples include Building Management, Access Control, Security, Safety, Environmental Monitoring, Transportation, Utility metering, Asset Tracking etc.);
3. Industrial (Examples include manufacturing, supervisory control and data acquisition (SCADA), etc.);
4. Mining: To monitor previously (invisible area) unconnected equipment behaviour in underground/harsh environments; Weightometers; yellow equipment; etc.;
5. Telecommunications Industry;
6. Government or Military;
7. Vehicle Monitoring (For example, the predictive maintenance of vehicle components); and
8. Logistics and transportation (For example, vehicle tracking, fuel management, security, etc.).

Depending on the purpose of the controller (or "Edge Gateway") and the types of external devices that were catered for by the hardware designer, the groupings of processor pins are usually routed on printed circuit boards (PCB's) to a set of fixed number of exposed physical industry standard connectors, such as:
Ethernet: Dedicated RJ-45 (on embedded PC's, "Edge Gateways" and PLC's (programmable logic controller), etc.),
UART (universal asynchronous receiver/transmitter): for example a DB9 serial port (on embedded PC's or "Edge Gateways", etc.),
CAN (Controller Area Network) bus: OBD-II (on vehicles, etc.), and
SPI (Serial Peripheral Interface) or I2C (Inter-Integrated Circuit): Dedicated Screw Terminals or Header Pins (on "Edge Gateways" or Raspberry Pi's).

The following communication protocols are currently used in the industry to connect to devices or sensors:
1. IP (Internet Protocol) based devices.
2. Dedicated hardware port/interface, such as TTL Serial, RS-232, RS-485, USB, SPI, I²C, CAN bus or Ethernet ports.
3. Binary Inputs (to detect a 3.3 VDC/5 VDC Voltage on a GPI processor pin). Examples include:
    An external Push Button pressed by a person to open a door by closing a Normally Open (N/O) switch, connected to a Common (C) reference,
    A magnetic Door Positioning Sensor, which opens a Normally Closed (N/C) circuit when the door is opened,
    A Passive Infrared Sensor, which regulates an output Voltage when movement is detected,
    A Smoke Detection Sensor, which regulates an output Voltage when smoke is detected,
    A weightometer that triggers a relay that is connected to an Odometer-like mechanical counter that displays the actual cumulative tonnages to a human operator or HMI (human machine interface).
4. Binary Outputs (to output a 3.3 VDC/5 VDC Voltage on a GPO processor pin). Examples include:
    To energise a relay coil that opens or closes solenoid that switches an isolated VAC or VDC power circuit that provides power to an external device such as a gate motor or siren which causes the device to be switched On or Off.
5. PWM (to generate a variable digital signal frequency on a GPO processor pin). Examples include:
    To control the speed of a variable stepper motor,
    To generate audio frequencies on audible devices for sound production.

Currently, all of the above can be accomplished by utilizing various different dedicated ports on existing controllers, such as PLCs, industrial embedded computers, Arduino, Raspberry Pi or commercial/industrial "Edge Gateways".

The standard way of connecting non-IP based devices to the cloud, are with what is termed "Edge Gateways". These Gateway devices usually can connect devices with some level of intelligence via dedicated hardware ports (e.g. RS232, RS485, USB, CAN bus, I²C). Some companies (for example Cisco, Dell & Samsung) are selling "Edge Gateways" that sits on premise ("at the edge") close to the sensors/devices. These gateways then communicate via various standards (GSM/Ethernet/WiFi/Long Range Wireless) to a cloud solution which usually consist of a combination of "Big Data", "Analytics", Machine Learning and mobile devices (such as smart phones or tablet) to analyse the data after the event and to generate alerts.

The main purpose of these IoT/Edge Gateways, are to connect to various non-IP based devices and sensors, filter/aggregate sensor values and to then push this data to the cloud, instead of having sensors that are directly connected to the cloud. Examples are temperature/humidity sensors and accelerometers, vibration sensor, etc. Some of these non-IP-based devices typically include 1-wire, 2-wire, I²C, SPI and CAN bus interfaces that cannot be connected to a IP-based network switch or router directly and requires a specific physical layer protocol to interrogate and control these devices. Cisco Systems has also coined the term "Fog Computing" for their edge routers (as opposed to "Cloud Computing") meaning intelligence has moved closer to the edge.

To date, all the industrial Edge Gateways that are sold, usually imply a device that has a Linux or Windows operating system, which can then be programmed to accumulate various sensors/device data via dedicated ports or detect simple inputs or emit simple outputs. Proprietary firmware/embedded devices also exist, with limited number of dedicated connectors for devices or sensors to plug into.

Figure 1:
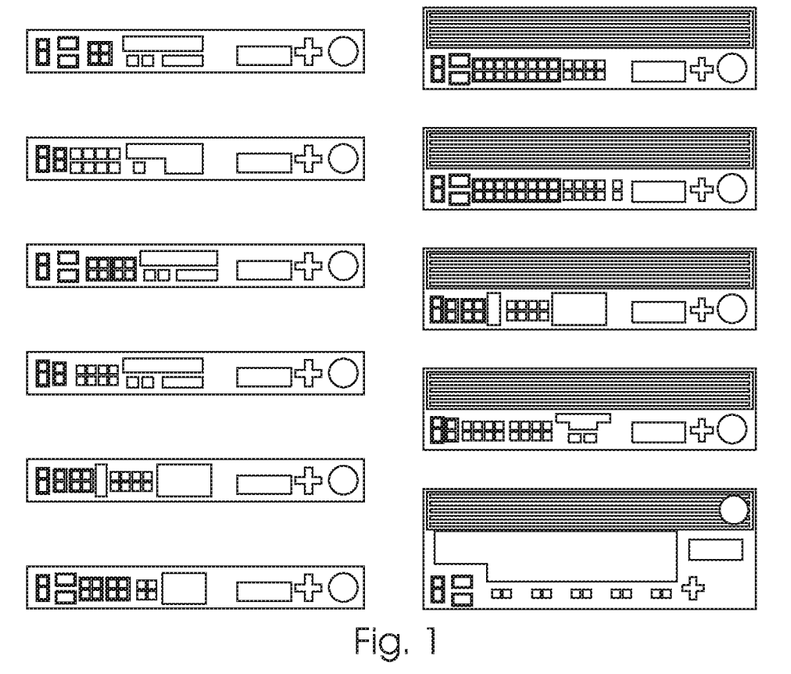
FIG. 1 shows a schematic plan view of existing edge gateway designs with different connection interfaces.
Figure 2:
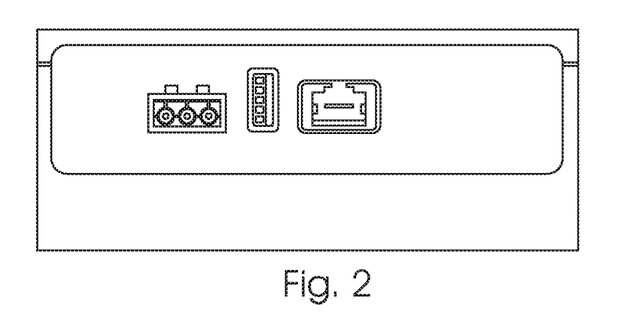
FIG. 2 shows a schematic plan view of an existing edge gateway design with a CAN bus interface.
Figure 3:
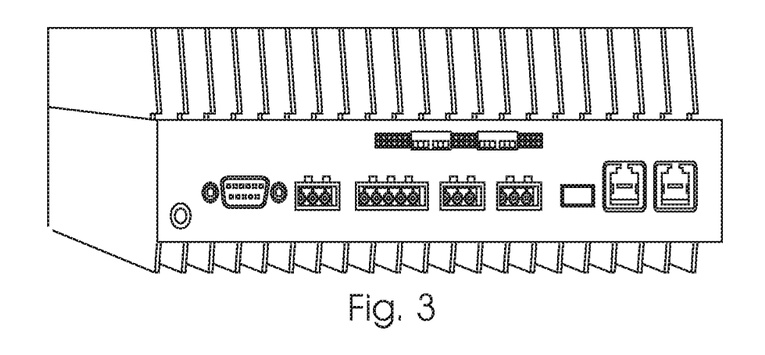
FIG. 3 shows a three-dimensional view of a gateway enclosure with various different connection interfaces.

FIG. 1 shows a few examples of edge gateways with different connection interfaces. In order to add new device interfaces, the product needs to be redesigned (including hardware and enclosure) or various models must be introduced. FIG. 2 shows an example of a gateway with a CAN bus interface only. FIG. 3 shows a Gateway enclosure with various different connection interfaces.

The cost-factor plays a major role in deciding the functionality of a dedicated edge gateway design. There is a trade-off between low-cost controllers with a very limited number of interfaces vs over-engineered controllers which are very expensive and are not guaranteed to be future proof in terms of new connectors or protocols.

The inventor wishes to address at least some of the problems identified above.

SUMMARY OF THE INVENTION

In accordance with a first aspect of the invention there is provided a software-defined device interface system, or a device interface system, which includes:
- a microprocessor/processing unit with a plurality of communication pins; and
- software/firmware which is configured (or written to allow), based on a specific communication protocol which is used by a particular device for communication purposes, to, in runtime,
    - assign/select one or more of the communication pins to form a virtual port to which the particular device can be connected, upon receiving a configuration instruction from a user to implement the specific communication protocol; and
    - implement the specific communication protocol through the virtual port, to thereby allow for communication between the microprocessor/processing unit and the device, when the device is connected to the pin(s) of the virtual port.

"Communication", in this instance, should be interpreted to also refer to communication flowing only in one direction (e.g. from the device through the virtual port to the processing unit). In other words, communication refers to communication in one direction as well as in both directions.

The term "virtual port" refers to a communication port which is formed by assigning/selecting, in runtime, one or more communication pins of the microprocessor/processing unit and using it together with appropriate/suitable software/firmware in order to allow a specific communication protocol to be implemented, wherein the assigned/selected communication pin(s) forms a physical connection for the device to be connected to the system.

The communication pins may be general purpose input/output (GPIO) pins.

The microprocessor may be, or forms part of, a central processing unit (microprocessor).

The software/firmware is typically run/executed on the microprocessor.

The software/firmware may be configured to utilise interrupt logic in order to receive information via the virtual port.

The software/firmware may be configured to utilise a signal generator(s) in order to transmit information through the virtual port.

The software/firmware may be configured to, in runtime, group/assign a collection of GPIO pins to form part of the virtual port, and implement the specific communication protocol by utilising the collection of GPIO pins. The software/firmware may be configured to, in runtime, implement two or more communication protocols in order to form two or more virtual ports to which devices, which utilise the specific communication protocols, can be connected. Using the available exposed GPIO pins the user can decide how many device interfaces may be needed and therefore created. The software/firmware may be configured to, in runtime, implement a number of communication protocols in order to create a number of virtual ports to which devices, which utilise the specific communication protocols, can be connected, when receiving input from a user (e.g. via a user interface) to create the said number of virtual ports.

The system may include one or more dedicated native microprocessor communication ports (e.g. USB, Ethernet, etc.). The dedicated communication ports may have dedicated pins for communication purposes (for example a TX (transmit) pin and RX (receive) pin in a serial port configuration). The dedicated communication ports may be implemented in hardware. The dedicated port(s) may include a universal asynchronous receiver/transmitter (UART) port.

The firmware/software may be configured to, in runtime, use the microprocessor's software-configurable timer counter/clock as a variable signal generator. The firmware/software may be configured to implement a rising/falling-edge interrupt on one or more of the GPIO pins which form the virtual port, in order to start/initiate a sampling process by which the pin is sampled/read at a frequency set by a software-configurable timer counter of the microprocessor.

The microprocessor may be configured to receive communication protocol information programmatically for implementing a specific communication protocol for a particular device from a remote computing device/server via a communication network. The system may include a programmable voltage switching circuit which is, in use, connected between the communication pins and the device, and which is configured to adjust/switch/change voltages between the communication pins on the one hand and an interface of the device on the other hand, depending on specific voltage requirements for the communication pins and the device, respectively. The programmable voltage switching circuit may be the programmable voltage switching circuit in accordance with the eight aspect of the invention described further below.

The microprocessor, software/firmware and programmable voltage switching circuit may form part of an edge gateway.

The system may include at least one library, preferably multiple libraries, which defines various communication protocols, which can be applied to a specific virtual port(s) which was created by the user. These communication protocols can then be used to effectively replace dedicated hardware ports, by merely assigning specific GPIO pins for a specific protocol on a specific virtual port, preferably in conjunction with a programmable voltage switching circuit/circuit arrangement. (see for example FIG. 17). The invention may avoid the creation of a specific hardware model of an edge gateway (such as depicted in FIG. 2) by utilising signal generators and interrupts in order to create/implement the protocol library on dynamic configurable virtual ports.

In accordance with a second aspect of the invention there is provided a method of defining/establishing an interface for a device which uses a specific communication protocol for communication purposes, wherein the method includes:
- assigning/selecting, in software/firmware, one or more communication pins of a microprocessor to form a virtual port to which the particular device can be connected; and
- implementing, in software/firmware, the specific communication protocol through the virtual port, to thereby allow for communication between the microprocessor and the device, when the device is connected to the virtual port.

The communication pins may be general purpose input/output (GPIO) pins of the microprocessor. The communication pins may also include tri-state capable pins.

The assigning/selecting step may include grouping/assigning a collection of GPIO pins to form part of the virtual port, and implementing the specific communication protocol by utilising the collection of GPIO pins.

The method may include utilising a programmable voltage switching circuit in order to regulate voltage levels between the collection of GPIO pins which forms the virtual port and the device.

The method may include sending programming instructions to the programmable voltage switching circuit to specify pin voltages of the microprocessor, on the one hand, and voltages of the device, on the other hand, wherein the programming instructions are sent from the microprocessor or any other remote computing device via a network.

In accordance with a third aspect of the invention there is provided a software-defined device interface which includes:
- a protocol module/library which is configured, based on a communication protocol which is used by a particular device, to, in runtime:
  - assign/select one or more communication pins of a microprocessor to form a port/virtual port to which a particular device can be connected; and
  - implement the specific communication protocol through the port, to thereby allow for communication between the microprocessor and the device, when the device is connected to the port/virtual port.

A "module", in the context of the specification, includes an identifiable portion of code, computational or executable instructions, or a computational object to achieve a particular function, operation, processing, or procedure. A module may be implemented in software or a combination of software and hardware.

In accordance with a fourth aspect of the invention there is provided a software-defined device interface which includes:
- a protocol module/library which is configured to define, in runtime, a device interface in the form of a port/virtual port for a specific communication protocol, by which one or more communication pins of a microprocessor is utilised to form the port/virtual port to which a specific device can be connected, to thereby facilitate the implementation of the communication protocol in order to allow communication with the specific device, when connected to the pin(s) which form the port/virtual port.

In accordance with a fifth aspect of the invention there is provided a gateway/edge gateway which includes a protocol module/library which is configured, based on a communication protocol which is used by a particular device, to, in runtime:
- assign/select one or more communication pins of a microprocessor to form a port/virtual port to which a particular device can be connected; and
- implement the specific communication protocol through the port/virtual port, to thereby allow for communication between the microprocessor and the device, when connected to the port/virtual port.

The gateway/edge gateway may include a programmable voltage switching circuit which may be utilized to cater for varying voltages between the microprocessor pins and voltage requirements of communication lines for the device interface/port. The programmable voltage switching circuit may be the programmable voltage switching circuit in accordance with the eighth aspect of the invention described below.

In accordance with a sixth aspect of the invention there is provided a software defined device interface system which is configured to utilizes native capabilities of a microprocessor in order to define one or more virtual communication port(s) to which a device(s) can be connected by assigning one or more communication pins of the microprocessor to form the virtual port and execute software/firmware which is configured to, in runtime, implement a communication protocol by utilising the pin(s) which forms the virtual port, to thereby communicate with the device, when connected to the port, by utilising the communication protocol.

In accordance with a seventh aspect of the invention there is provided a software defined device interface system (proposed to be used in an Edge Gateway, although not limited to), said system including:
- a microprocessor having a number fixed number of dedicated ports, for example UART;
- the microprocessor also provides general purpose input and output pins (GPIO pins);
- software code programmed onto the system to permit assigning any one, or a collection of, the microprocessor's GPIO pins to be grouped into a physical device interface, or virtual port;
- a user interface provided by the system, whereby the device interface system is configurable to a purpose or purposes as required for interfacing with hardware devices (sensors for example) requiring a specific set of data and clock pins, implementing a software configurable protocol; and
- simple devices which provide binary input or binary output via a simple voltage signal.

The system may be configured to utilise signal generators and interrupts to create software protocol libraries to effectively replace built-in dedicated hardware circuitry.

The system effectively includes software code programmed onto the system to permit assigning any one, or a collection of, the microprocessor's native capabilities (as listed below) to define a device interface, or virtual port that can implement a specific protocol that is normally associated with this type of port.

The microprocessor, as mentioned in any of the above-mentioned aspects of the invention, may include/provide the following native processor capabilities:
- GPIO pins that allow readable and writeable high and low voltages;
- tri-state logic that allows for fast bidirectional sinking/sourcing of voltages on a single pin;
- interrupt functionality that can trigger on voltage level changes (e.g. rising/falling edge detection) or discrete pin state changes (e.g. edge-high/edge-low detection);
- signal generators or configurable timer counters with software sub routines that can change voltage levels at (accurate) programmable variable frequencies.

Since the system is effectively implemented in runtime, the system does not need to restart and no hardware needs to be redesigned if a new communication port or protocol is required.

The system need not have specific hardware ports or device interfaces that are hard wired in the microprocessor's dedicated circuitry.

The device interface or port configuration can, in runtime, be configured by a user to implement the protocol required for a specific device that is connected to the virtual port.

The system does not need an operating system and may use an open source implementation of the Microsoft™ .NET Micro framework or any other custom firmware.

The software configurable ports may be expanded on via I²C or other means to daisy-chain multiple input or output ports.

The system/gateway may be remotely configured via an embedded web server or other means, to define and configure a new device interface.

The gateway may include some standard configurations which simplifies the grouping of GPIO's for a number of desired or often used configurations and protocols such as UART.

The gateway may have an embedded web server to enable installers to do initial diagnostics and configuration, which is stored on the gateway for its entire lifetime.

The gateway may include storage for persisting data in a constrained storage space. The storage may be a record storage file system, without the need of an operating system.

A software defined device interface may combine software logic and native microprocessor pin capabilities to overcome the limitations of having a dedicated hardware port in the microprocessor or electronic circuit design that is dedicated for a specific device or protocol such as a dedicated UART.

Thus, the software defined device interface of the invention may permit firmware to incorporate the features of modern day microprocessor native GPIO pin capabilities to reinterpret existing device interfaces. The combination of high speed clock cycles, signal generators and pin configurations (input, output, tristate) allows for said interface to implement communication protocols without the need of dedicated processor embedded circuitry, for example UART, I²C, CAN bus or SPI. Any protocol data transmit and receive logic may be controlled precisely using interrupt logic for receive and signal generators for transmit.

The interface of the invention thus may allow for general purpose pins to emulate special functions to expand interfaces even if not supported by the underlying microprocessor hardware architecture.

The invention thus provides for the use of the GPIO pins on a microprocessor via software or firmware to simulate or enhance or extend hardwired ports or connections.

The system of the invention extends to a method of defining an interface, said method including:
  Configuring software and/or firmware to bundle GPIO's on a microprocessor as a device interface port; and
  Programming the software and/or firmware to utilise the following
    timing on an emulated port using a signal generator and/or software timing to properly clock said timing;
    applying logic according to the specific type of port that is emulated, for example, serial port or I²C port or SPI port, or the like; and
    applying protocol logic over the emulated (Software Defined) port.

In accordance with an eighth aspect of the invention there is provided a programmable voltage switching circuit which includes:
  a plurality of first connectors, wherein each first connector is for connecting to a specific pin of a microprocessor, when in use;
  a plurality of second connectors, wherein each second connector corresponds to/is associated with a specific first connector to thereby form pairs of first and second connectors, and wherein the second connectors are, in use, connected to a device; and
  a switching arrangement/module which is configured to adapt/change voltage levels between the first and second connectors of each pair, depending on certain voltage requirements of the microprocessor on the one side, and certain voltage requirements of the device on the other side.

In accordance with a ninth aspect of the invention there is provided a software-defined device interface which includes:
  a protocol library which is configured to define, in run-time, a device interface in the form of a virtual port for a specific communication protocol for a specific device by grouping one or more communication pins together, and
  a programmable voltage switching circuit which is located between a microprocessor on which the protocol library is implemented/installed and the device, when in use, and which is configured to adjust in run-time a device interface voltage and a microprocessor pin voltage tolerance/level.

DESCRIPTION OF THE DRAWINGS

The invention will now be described, by way of example, with reference to the accompanying diagrammatic drawings. In the drawings.

DETAILED DESCRIPTION OF PREFERRED EMBODIMENTS

The invention relates to a software defined device interface system which can be deployed remotely by a user (or programmatically as batches), and configured in runtime, without hardware circuitry changes being required and which allows a user to configure device interfaces remotely, as and when required. This allows configuration in runtime, via software configuration, to define a device interface (virtual port), using GPIO pins on a microprocessor. In addition, the user can configure the device interface via software, to implement any current or even future communication protocol on the device interface. This virtual, software defined "port" eliminates the requirement to have dedicated electronic circuitry for different "ports" which are used to connect and communicate with devices. The differences between native microprocessor and device/sensor voltages are solved using a programmable voltage switching circuit.

Figure 4:
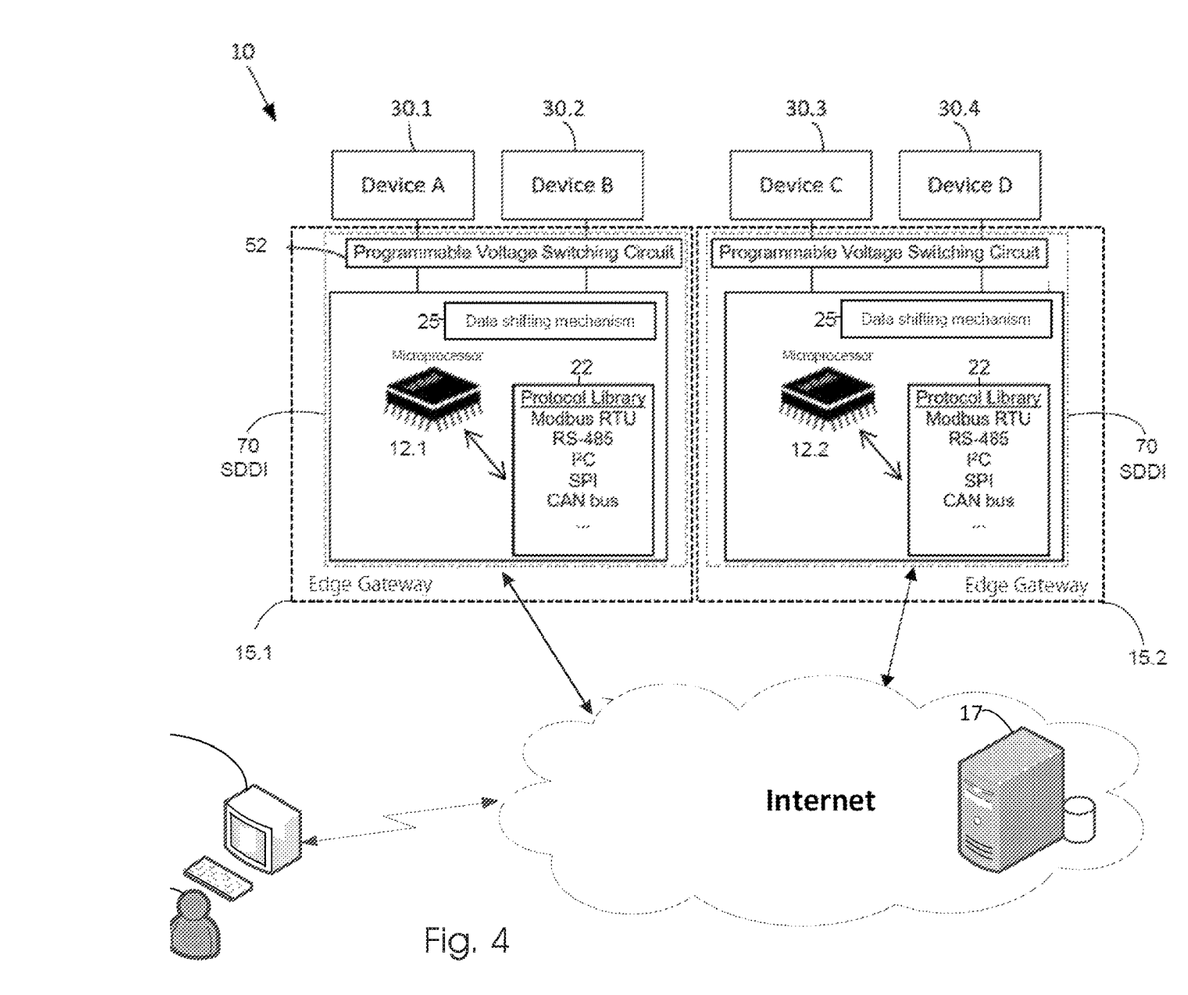
FIG. 4 shows the schematic layout of the system in accordance with the invention.
Figure 5:
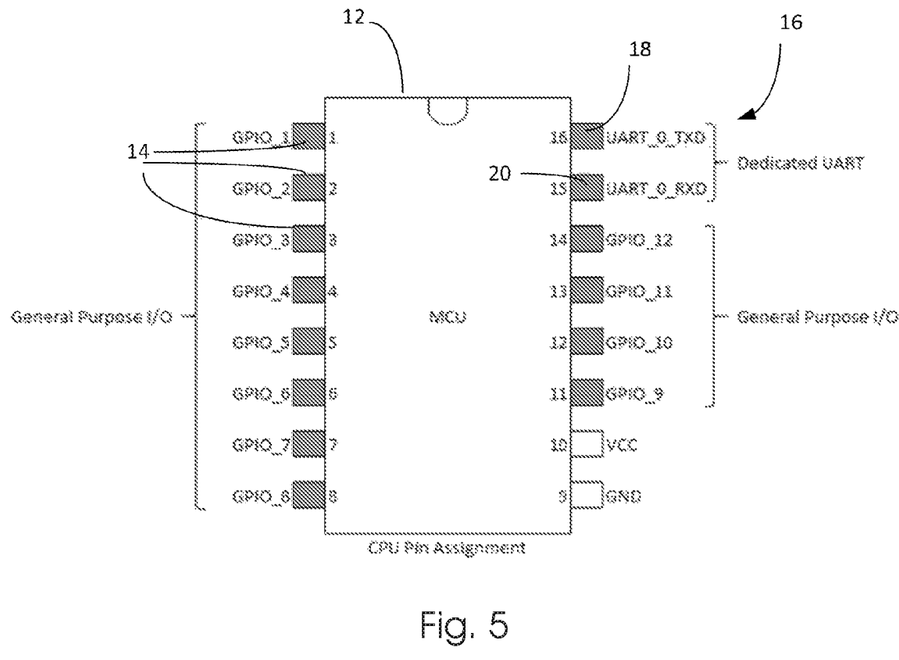
FIG. 5 shows a schematic layout of a microprocessor with two dedicated UART pins and other available GPIO pins.

In FIG. 4, reference numeral 10 refers generally to a system in accordance with the invention. The system typically includes one or more microprocessor(s) 12.1, 12.2 (collectively hereinafter referred to as 12) which are connected to a larger communication network, such as a cloud-based computing network (via the Internet). Each microprocessor/microprocessor 12 (for ease of reference, hereinafter only referred to as the microprocessor 12) has a number of communication pins 14 (FIG. 5). The invention combines a microprocessor 12, protocol library 22 and programmable voltage switching circuit 52. Edge gateways 15.1 and 15.2 (hereinafter only referred to as 15) can now be manufactured utilizing the invention.

As mentioned, non-IP based devices can generally not be connected directly to the Internet/a cloud-based computing system. The communication protocols for different non-IP based devices also generally differ from each other. Some of these communication protocols include TTL (transistor-transistor logic) serial, RS-232, RS-485, USB, SPI, I²C, CAN bus, etc. They may need to utilise only one pin or a number of pins for communication purposes. Some device interfaces require different voltage levels for communication which requires different hardware designs for the different communication interfaces or hardware ports.

Figure 17:
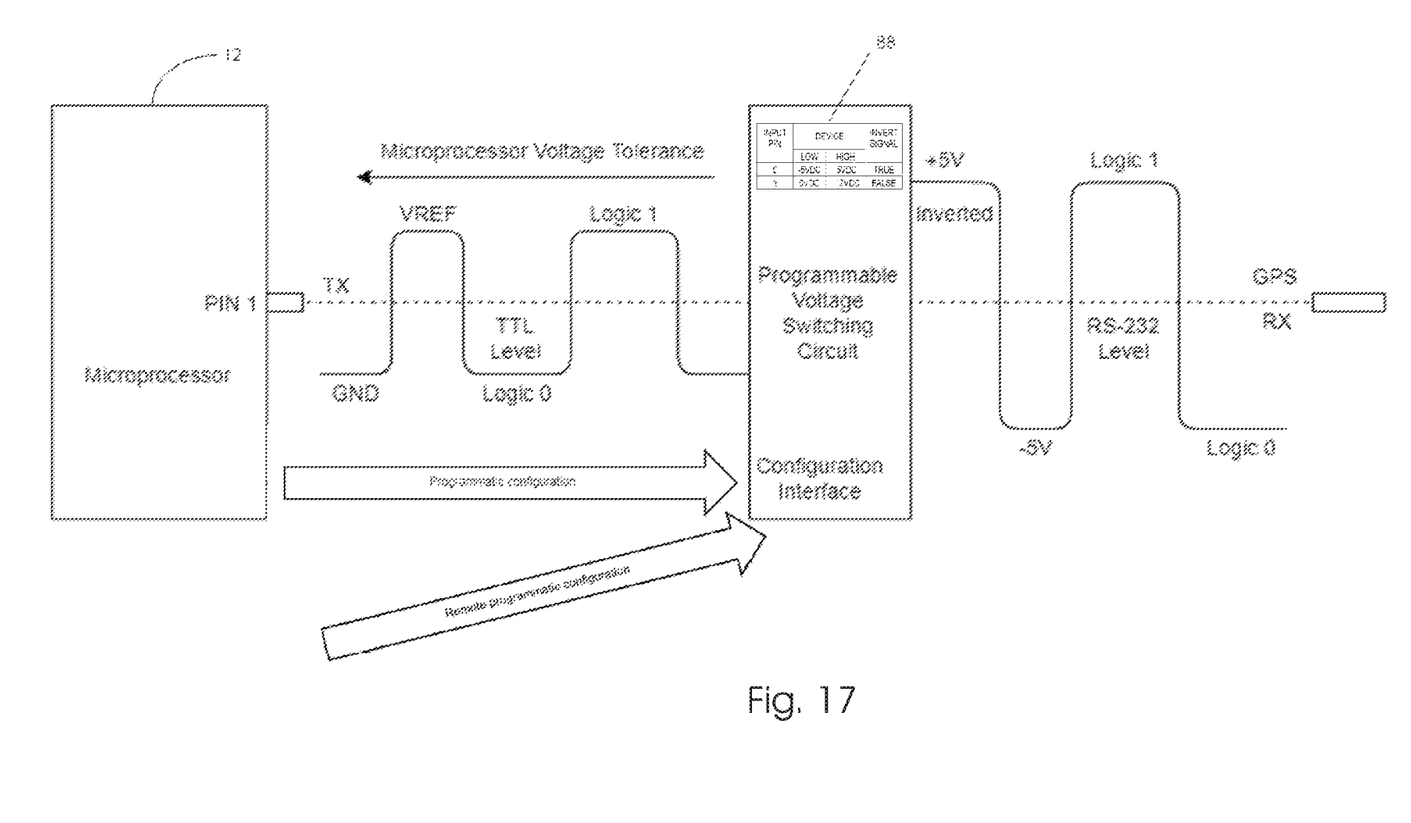
FIG. 17 shows schematic layout of a TX line voltage level (of the programmable voltage switching circuit of FIG. 16) switching from TTL level (on the processor side) to RS-232.

The invention uses a programmable voltage switching circuit 52 that allows any processor voltage level to be connected to any device interface voltage level(s). It allows the configuration of these levels (including whether or not the levels are inverted) to be done via a programmable interface. FIG. 17 shows a TX line voltage level switching from TTL level (on the processor side) to RS-232 (±5V level) to a connected GPS device. In this example the programmable voltage switching circuit's voltage-mapping table 88 is configured using a I²C interface which enables the invention to replicate the functionality of a dedicated RS-232 IC (such as Maxim's MAX232 IC) in software without the need of a hardware re-design. The voltage switching circuit is not limited to this example but can be applied to any other dedicated hardware port/design required.

The current system 10, however, includes appropriate software/firmware which, when executed (e.g. by the microprocessor 12), assigns or designates one or more GPIO pins 14 which can be used for a specific type of communication protocol, depending on the type of device which should be connected to the microprocessor 12. More specifically, the system 10 typically includes a database 22 on which a library of a plurality of different communication protocols are stored. This database 22 may be stored on a database near the microprocessor 12 or at a remote storage/library facility (e.g. stored in a cloud-based system 17). A user 100 may then use a computer 200 to download and/or configure a specific microprocessor 12, via the Internet, to implement a certain communication protocol for a specific device 30.1-30.4 (collectively referred to as 30) which should be connected to the microprocessor 12 via the programmable voltage switching circuit 52. The communication protocol is typically implemented in software/firmware which, when executed (using the data shifting mechanism 25 as described further down in the specification), utilises the GPIO pins 14 as physical connection/communication points with the device 30.

More specifically, when the microprocessor 12 executes the software/firmware, it, in runtime, designates/assigns one or more of the GPIO pins 14 for implementing the specified communication protocol for communicating with the device 30 via the programmable voltage switching circuit 52. The GPIO pins 14, voltage switching circuit 52, together with the software/firmware and protocol libraries, therefore creates or defines a device interface for allowing communication with the particular device 30. Certain protocols may only require one pin, while other protocols may require a plurality of GPIO pins 14, which will result in the software/firmware grouping/clustering a plurality of the GPIO pins 14 together in order to implement the communication protocol. It is important to note from the above that GPIO pins 14 typically have no special function when the software/firmware is not executed. However, the moment the software/firmware is executed, one or more of the GPIO pins 14 are effectively transformed into a virtual port for connecting to the device 30 and for allowing communication between the device 30 and microprocessor 12. In other words, the virtual ports are created in runtime. It should be appreciated that more than one "virtual port" can be created in runtime by the microprocessor 12.

As shown in FIG. 5, the microprocessor 12 may include a plurality of general purpose input/output (GPIO) pins (see GPIO_1-GPIO_12). In addition, the microprocessor 12 can also include a dedicated/hardware-defined universal asynchronous receiver/transmitter (UART) serial port (reference numeral 16) which includes two dedicated pins (reference numerals 18 and 20) for transmitting (UART_0_TXD) and receiving (UART_0_RXD) purposes.

Figure 6:
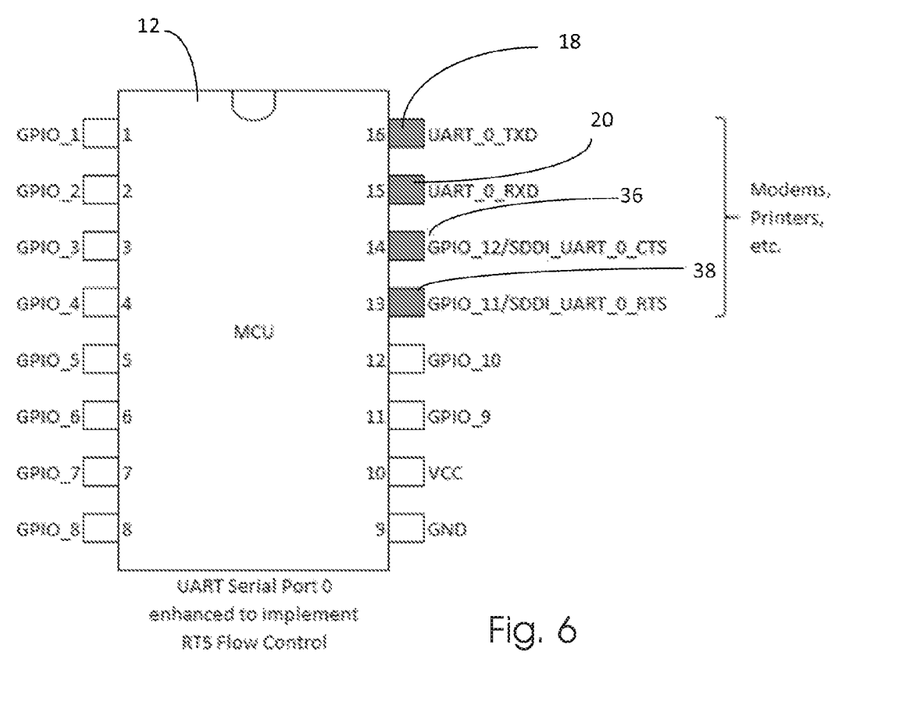
FIG. 6 shows a schematic layout of the microprocessor of FIG. 5, where two GPIO pins are allocated to extend the UART of FIG. 5 to include hardware flow control pins CTS and RTS.

Reference is now made to FIG. 6, which illustrates an example of where CTS/RTS flow control is implemented for the UART. The CTS/RTS flow control requires that the UART have CTS (Clear-To-Send) and RTS (Request-To-Send) control lines (see the pins 36, 38). In this case the microprocessor 12 only provides the dedicated TX and RX data lines for UART by means of its native capabilities (dedicated port), while the CTS and RTS lines are implemented by utilising the software/firmware. More specifically, the system is configured to allow software to allocate any two GPIO pins (e.g. GPIO_12, GPIO_11) for CTS and RTS, to enhance the existing TX and RX data lines of the native UART, to thereby mimic the necessary hardware flow control required by some devices in run-time, such as GSM modems that may require hardware flow control.

Figure 7:
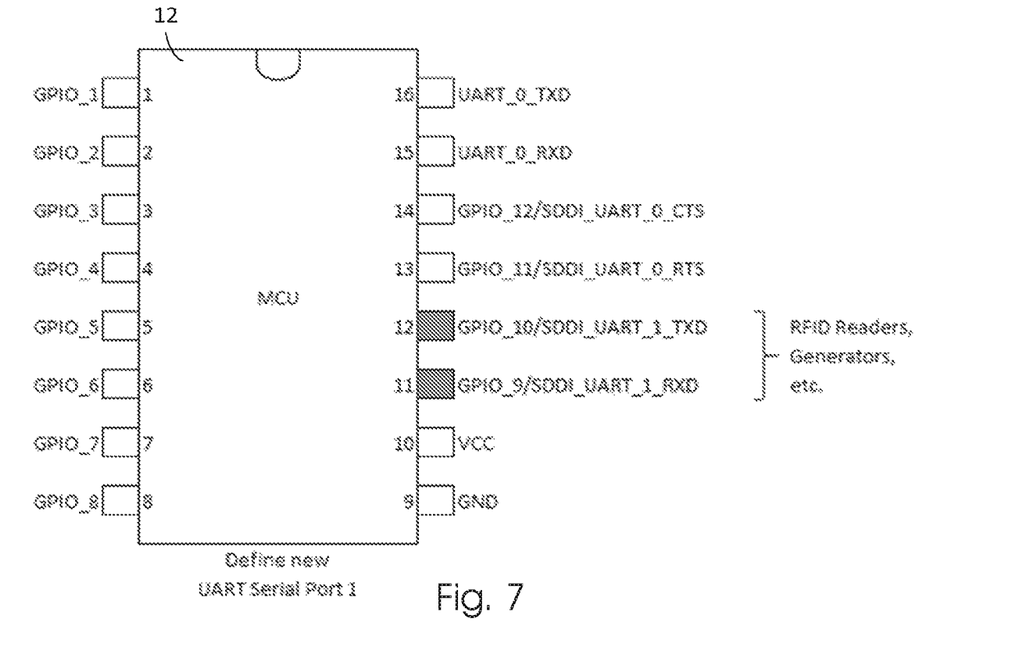
FIG. 7 shows a schematic layout of the microprocessor of FIG. 6, with two additional GPIO pins forming a new virtual UART with TXD and RxD lines.

In the example shown in FIG. 7, the software is configured to, in runtime, allocate any two GPIO pins (e.g. GPIO_10, GPIO_9) to define TX and RX data lines in order to implement a TTL serial interface using signal generators and interrupt based level change detection.

Example 1

An example of how the UART protocol is implemented will now be described. This implementation may also be referred to as the "data shifting mechanism" for UART communication without the use of a dedicated TTL to RS-232 IC.

The UART protocol can be implemented using the microprocessor's software configurable timer counter operating at a frequency of the required/relevant BAUD rate.

In runtime, TX (Transmission) bits are shifted out on a GPO pin (GPIO pin acting as an output pin) within a software timer sub-routine to include, for example, 1 start bit, 8 data bits and 1 stop bit.

The software initially activates a rising-edge interrupt on the GPI pin (GPIO pin acting as an input pin) associated with the RX line, which starts a timer counter to sample the GPI pin state at a frequency required by the BAUD rate, in order to shift in the 8 data bits. After receiving the stop bit the interrupt can be re-enabled to signal the next received start bit.

It will be appreciated that all the above can be achieved in software using the functionality of most common microprocessors.

Figure 8:
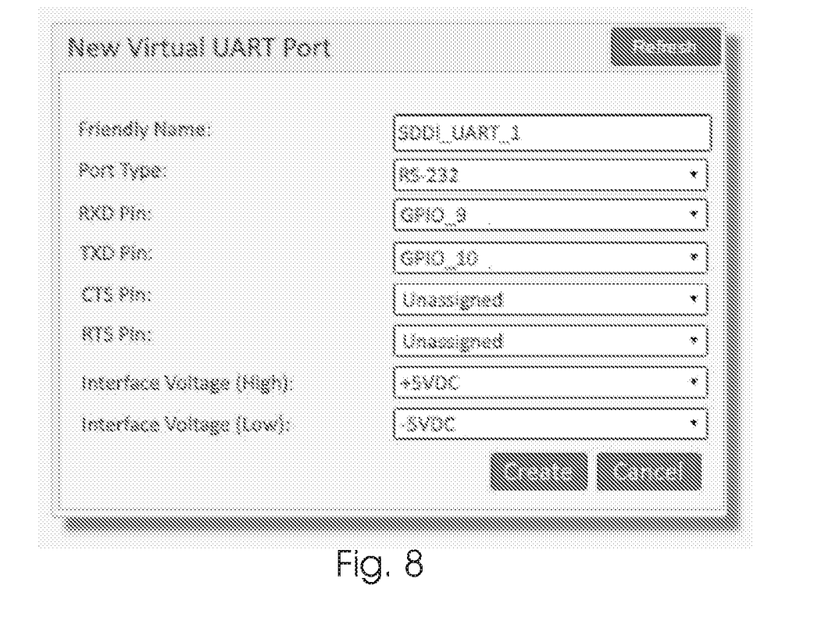
FIG. 8 shows a screenshot of a user interface via which the two GPIO pins of FIG. 7 can be configured as an additional virtual UART port which was not provided for in the microprocessor architecture.

This newly added UART serial port (FIG. 7) can be created or defined in runtime using a software interface such as depicted in FIG. 8.

Figure 10:
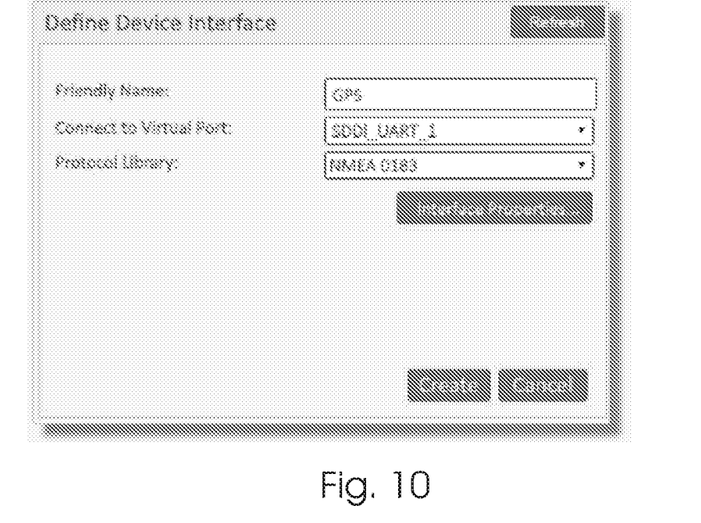
FIG. 10 shows a screenshot of a user interface via which the protocol can be defined for FIG. 8.

A user 100 can, for example, now use a software interface such as FIG. 10 to link a device to the virtual port SDDI_UART_1 (which was created in software) via the selected protocol library NMEA 0183 to read GPS coordinates from the device.

It should however be appreciated that the invention is not only limited to just the UART protocol, but can implement a large variety of communication protocols as described in examples to follow.

Example 2

Figure 9:
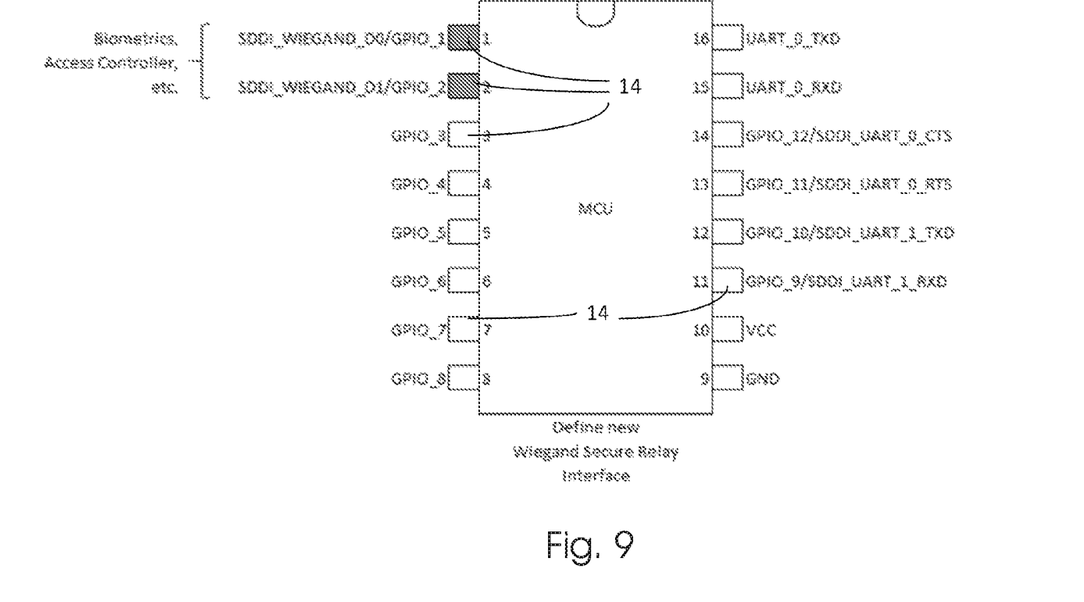
FIG. 9 shows a schematic layout of a microprocessor where two GPIO pins are allocated for communication via a Wiegand communication protocol.

This example illustrates how the system 10 can be used to implement a Wiegand communication protocol (see FIG. 9). A protocol such as Wiegand requires a D0 and D1 line to be connected to the microprocessor. With the system 10, a user 100 can configure any 2 of the GPIO pins 14 to allocate to D0 and D1 (GPIO_1, GPIO_2), and the software will then implement the Wiegand protocol with the configured GPIO pins while voltage correction is achieved using the voltage switching circuit 52.

Figure 11:
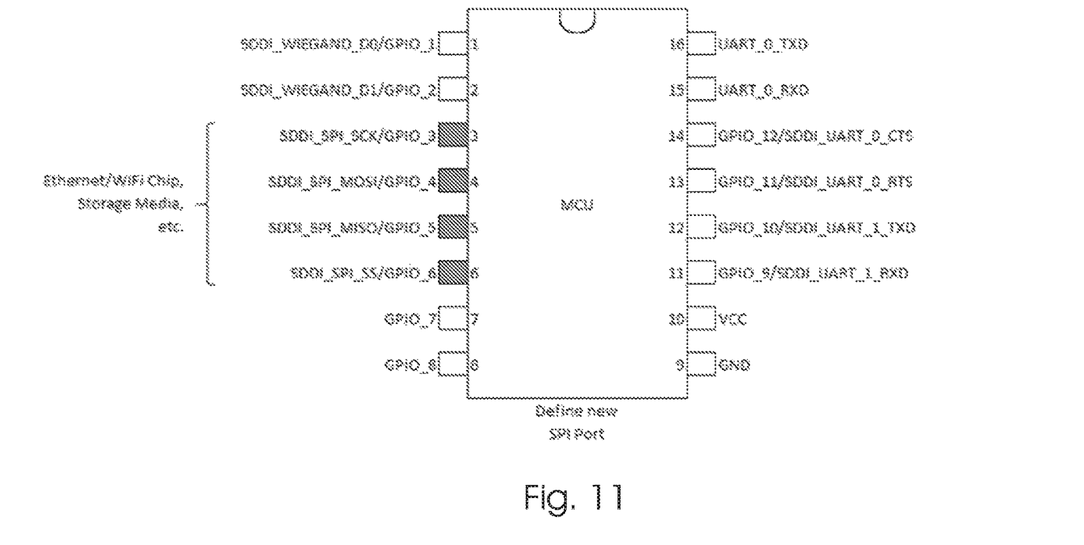
FIGS. 11-14 each show schematic layouts of examples of various software defined interfaces (virtual ports) consisting of groupings of GPIO pins which can be configured by the user linked to the intended protocol.
Figure 12:
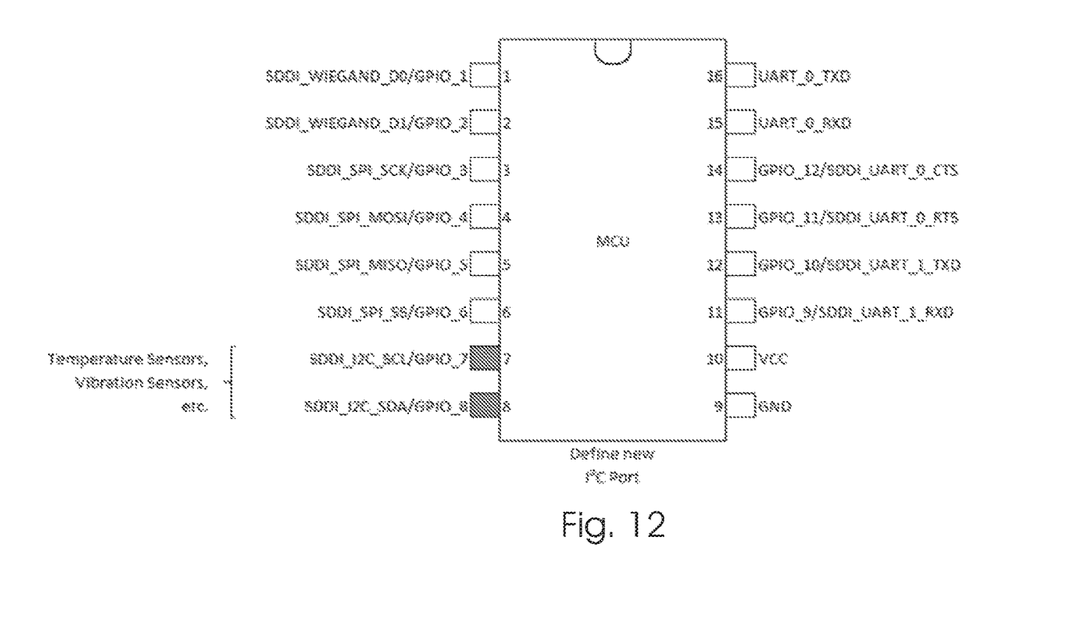
Figure 13:
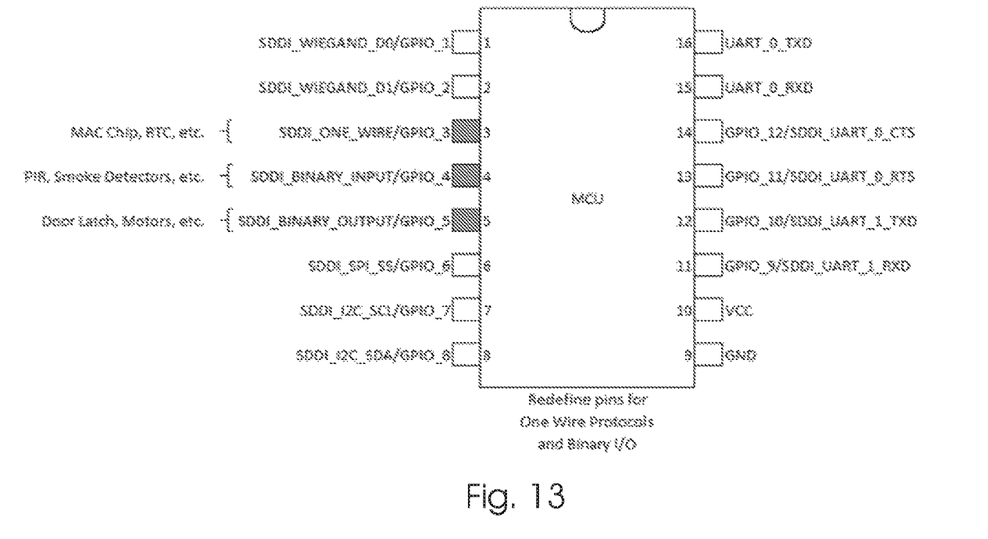
Figure 14:
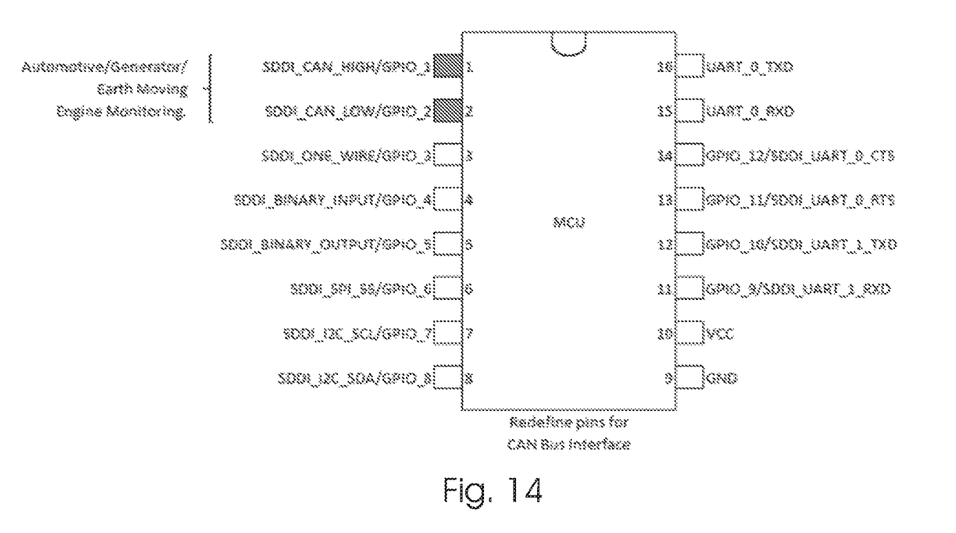

In a similar fashion as described above, devices 30 and communication protocols that do not exist currently, may be connected and implemented in future, by upgrading the software to add protocols and device-specific communication logic, and by adding software configurable parameters. It should also be noted that the term "device" also refers to certain types of sensors, such as temperature sensors, vibration sensors, etc. (see FIG. 12). FIGS. 11, 13 and 14 illustrate additional non-IP based devices that can be connected to the microprocessor 12 via one or more of the GPIO pins 14. These devices may, for example, be a MAC (media access control) chip, RTC (real-time clock), a PIR sensors (passive infrared sensor), smoke detectors, door latches, motors, automotive devices, generators, engine monitoring systems and earthmoving equipment.

Example 3

This example illustrates how the system 10 can be used to configure a microprocessor in runtime for use with a particular device 30, by implementing a specific communication protocol.

Figure 15:
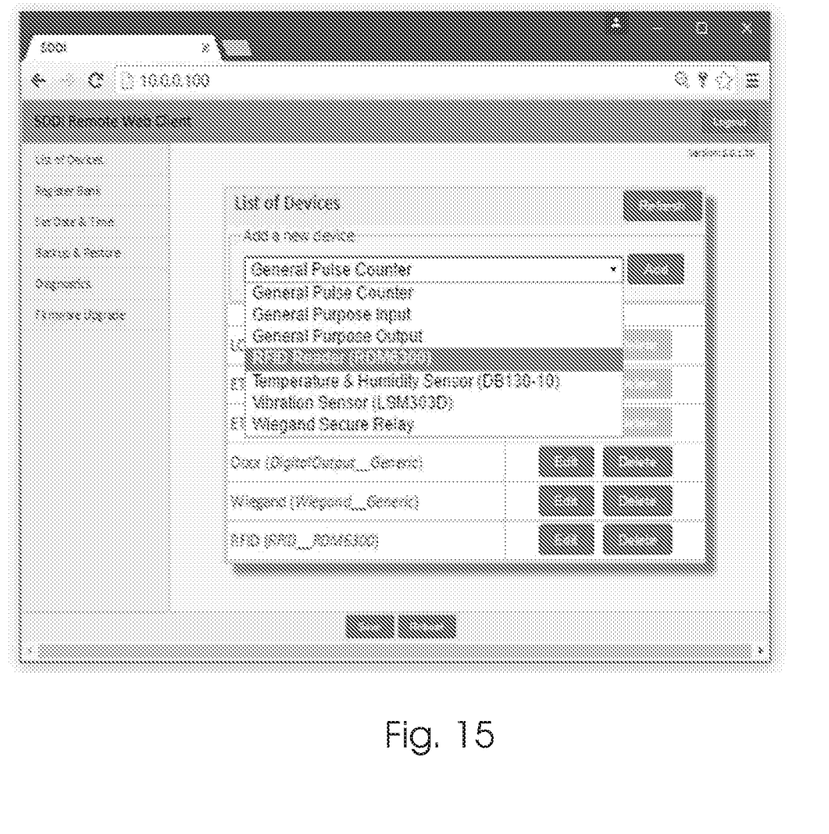
FIG. 15 shows a screenshot of a user interface via which all the interfaces of an edge gateway could be configured.

The system 10 can include a multitude of existing software, protocol/device libraries. Reference is in this regard made to an example of a user interface of the system 10 shown in FIG. 15. To add a new device connection, the type of device protocol can typically be selected from an available list of implemented device drivers. Each protocol library has the capability to be utilized with an associated software defined device interface (which can be configured in runtime). Once selected, the relevant device interface can be configured as required (see the example of the user interface shown in FIG. 8).

Figure 16:
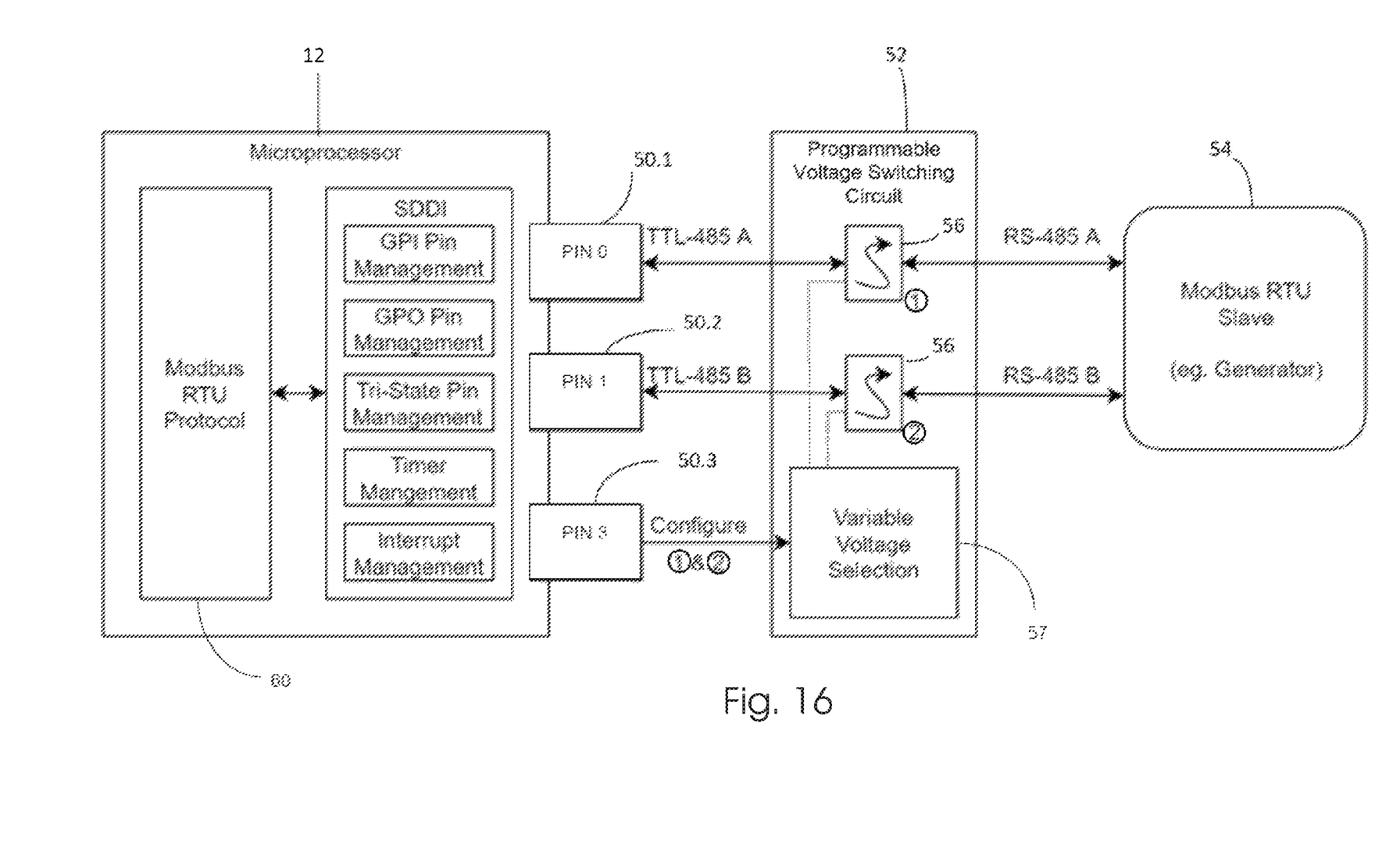
FIG. 16 shows a schematic layout of a microprocessor which is connected to a programmable voltage switching circuit.

In FIG. 16, the microprocessor 12 is configured, in software/firmware, to implement a Modbus RTU (remote terminal unit) communication protocol (see reference numeral 60) in order to allow to communicate with a particular device 54. The programmable voltage switching circuit 52 is configured to adjust the voltage level on an individual pin basis, depending on the type of device interface 54 to which the microprocessor 12 is connected (via the voltage switching circuit 52). In other words, the voltage switching circuit 52 acts as an intermediary between the pins 50 and the device 54 and can adapt the voltage level, depending on the voltage requirements of the unit/device receiving the voltage signal. Each pin 50 may therefore typically be connected to a voltage switching sub-circuit 56 which forms part of the circuit 52 that can be individually configured to convert the microprocessor pin 50 voltage tolerance to the voltage level requirements of device 54 through a software configurable method 57.

In one example, the GPIO pins 14 of the microprocessor 12 may be configured, by means of the software/firmware, to be grouped together in order to configure the following interfaces/virtual ports:

Any number of GPIO pins 14 may be grouped to configure the following interfaces/ports (not limited to these):
A) Any 2 GPIO pins 14 can be assigned to be a transmit pin (GPO pin) and receive pin (GPI pin) of (for example) a UART (serial) connection, respectively, by using the data shifting mechanism described later.
B) Any 2 tri-state pins 14 for RS-485 to control and monitor A and B data lines of a half-duplex bus using the data shifting mechanism described later.
C) Any 2 GPI pins 14 can be used to monitor the Wiegand protocol that is read on the D0 and D1 data lines using the data shifting mechanism described later.
D) Any 2 tri-State pins 14 for CAN bus protocol to control and monitor CAN+ and CAN− data lines using the data shifting mechanism described later.
E) Any 3 GPIO pins 14 can be assigned to connect to a sensor or device via the SPI protocol; 1 GPI pin 14 for MISO (master in slave out), 2 GPO pins 14 for MOSI (master out slave in) and SCK (serial clock) respectively using the data shifting mechanism described later.
F) Any 2 pins could be configured to act as an $I^2C$ master or slave device on a "BUS" topology. The $I^2C$ master (which would typically in this case be an edge gateway) will have 1 GPO pin that drives the SCK (serial clock) line, and 1 tri-state pin for the SDA (serial data) line using the data shifting mechanism described later.
G) Any 1 tri-state pin 14 for connecting to a one wire device, such as an EPROM chip using the data shifting mechanism described later.
H) Any 1 GPI pin 14 can be configured to monitor an external device that operates by closing a normally open (N/O) switch on a common (C) reference (or vice versa) as an input signal.

I) Any 1 GPO pin 14 can be configured to toggle, for example, a relay.

It should however be appreciated that the system 10 is not limited to the "virtual port" examples listed above.

Data Shifting Mechanism

The following communication techniques can be used in various different communication protocols and typically relies on the native processing capabilities of the microprocessor 12. This technique is described as follows:

A signal is generated by the microprocessor 12 at a frequency defined in software that periodically executes a software sub routine that can read/write the state of a GPIO pin 14.

Interrupts are used to signal the start of a receiving data shift cycle, where after the timer counter can be used to sample incoming data lines (of specific bit-length) at specific configurable sample frequencies defining the transfer bit-rate.

Tri-state pins can allow for multi directional data streams to be shifted in/out on the same microprocessor pin using an internal pull-up (or pull-up residing in the programmable voltage switching circuit 52) and changing the pin direction between input and output whilst maintaining an active low output signal.

Programmable Voltage Switching Circuit

It should be noted that the system 10 can include a generic hardware circuit with fast switching two-way DC-to-DC Volt shifting capabilities (with isolation protection) to convert the microprocessor GPIO Voltage to/from the device interface-specific voltage requirements. The voltage level shifting circuitry is software configurable depending on the type of device interface that is created. Reference is in this regard specifically made to FIG. 16 and FIG. 17. In FIG. 16, the microprocessor 12 includes three tri-state pins 50.1-50.3 (collectively hereinafter referred to as 50) which are connected to a programmable voltage switching circuit 52. The microprocessor or system 10 can programmatically configure the voltage mapping table 88 via the configuration interface connected to pin 50.3 or via any other electronic means. This individually configures the sub-circuits 56 of the programmable voltage switching circuit 52 to map the processor pin voltage to the device interface voltage level with built-in isolation protection. FIG. 17 illustrates the signal level conversions from TTL serial to RS-232 of an TX data line by inverting and changing the voltage levels from the microprocessor voltage tolerance to the RS232 protocol specific voltage requirements by using a I²C interface that configures the mapping table 88.

From the above, it should be clear that the system 10 has considerable advantages over current hard-wired device interfaces, since the interfaces can be implemented in software, in combination with GPIO pins 14 and the programmable voltage switching circuit 52. The parameters of the communication protocols can also be configured remotely via a communication network on software programmable user interfaces. In other words, a person does not need to physically be at the system 10 in order to update any communication protocols thereon.

The invention claimed is:

1. A software-defined device interface system which includes:
    a microprocessor with a plurality of general purpose input/output (GPIO) pins; and
    software/firmware which is configured, based on a specific communication protocol which is used by a particular external device for communication purposes, to, in runtime,
    assign/select one or more of the GPIO pins to form a virtual port to which the particular external device can be connected, upon receiving a configuration instruction from a user to implement the specific communication protocol, and
    implement the specific communication protocol through the virtual port by emulating signals defined in a protocol specification of the specific communication protocol on the GPIO pins that form the virtual port, to thereby allow for communication between the microprocessor and the external device, when the external device is connected to the pin(s) of the virtual port,
    wherein the system further includes a voltage switching circuit which is connectable between the GPIO pins that form the virtual port and the external device, and which is operable to convert between a TTL (transistor-transistor logic) or CMOS (Complementary metal-oxide-semiconductor) voltage level that represents a logic 0 on the GPIO pins that form the virtual port and a voltage level that represents a logic 0 on a communication interface of the external device, and to convert between a TTL or CMOS voltage level that represents a logic 1 on the GPIO pins that form the virtual port and a voltage level that represents a logic 1 on the communication interface of the external device,
    wherein the voltage switching circuit has at least two programmable settings that are selectable by the microprocessor to set the voltage levels that respectively represent a logic 0 and 1 on the communication interface of the external device,
    and wherein the specific communication protocol is selectable from the group consisting of at least MODBUS RTU over RS-485, MODBUS RTU over RS-232, Universal Asynchronous Receiver-Transmitter (UART) over RS-485, UART over RS-232, Serial Peripheral Interface (SPI), inter-integrated circuit (I²C), Controller Area Network (CAN) bus, and Wiegand.

2. The system of claim 1, wherein the software/firmware is configured to utilise interrupt logic in order to receive information via the virtual port.

3. The system of claim 1, wherein the software/firmware is configured to utilise a signal generator(s) in order to transmit information through the virtual port.

4. The system of claim 3, wherein the firmware/software is configured to, in runtime, use the microprocessor's software-configurable timer counter/clock as a variable signal generator.

5. The system of claim 1, wherein the software/firmware is configured to, in runtime, implement two or more communication protocols in order to form two or more virtual ports to which devices, which utilise the specific communication protocols, can be connected.

6. The system of claim 1, which includes one or more dedicated native microprocessor communication ports.

7. The system of claim 6, wherein the dedicated port(s) includes a universal asynchronous receiver/transmitter (UART) port.

8. The system of claim 1, wherein the firmware/software is configured to implement a rising-edge/failing-edge interrupt on one or more of the GPIO pins which form the virtual port, in order to start/initiate a sampling process by which the pin(s) is/are sampled/read at a frequency set by a software-configurable timer counter of the microprocessor.

9. The system of claim 1, wherein the microprocessor is configured to receive communication protocol information programmatically for implementing a specific communication protocol for a particular device from a remote computing device/server via a communication network.

10. The system of claim 1, wherein the microprocessor, software/firmware and programmable voltage switching circuit form part of an edge gateway.

11. A method of establishing an interface for communication with an external device which uses a specific communication protocol for communication purposes, wherein the method includes:
- assigning/selecting, in software/firmware, one or more general purpose input/output (GPIO) pins of a microprocessor to form a virtual port to which a particular device can be connected, wherein the device utilises a specific communication protocol;
- implementing, in software/firmware, the specific communication protocol through the virtual port by emulating signals defined in a protocol specification of the specific communication protocol on the GPIO pins that form the virtual port, to thereby allow for communication between the microprocessor and the external device, when the external device is connected to the virtual port;
- connecting a programmable voltage switching circuit between the GPIO pins that form the virtual port and the external device; and
- programming the voltage switching circuit and selecting a configuration setting thereof to translate between a TTL (transistor-transistor logic) or CMOS (Complementary metal-oxide-semiconductor) 4volt-age level that represents a logic 0 on the GPIO pins that form the virtual port and a voltage level that represents a logic 0 on a communication interface of the external device, and to convert between a TTL or CMOS voltage level that represents a logic 1 on the GPIO pins that form the virtual port and a voltage level that represents a logic 1 on the communication interface of the external device, wherein the voltage switching circuit has at least two programmable settings that are selectable by the microprocessor to set the voltage levels that respectively represent a logic 0 and 1 on the communication interface of the external device, and wherein the specific communication protocol is selectable from the group consisting of at least MODBUS RTU over RS-485, MODBUS RTU over RS-232, Universal Asynchronous Receiver-Transmitter (UART) over RS-485, UART over RS-232, Serial Peripheral Interface (SPI), inter-integrated circuit ($I^2C$), Controller Area Network (CAN) bus, and Wiegand.

12. The method of claim 11, which includes sending programming instructions to the programmable voltage switching circuit to specify pin voltages of the microprocessor, on the one hand, and voltages of the device, on the other hand, wherein the programming instructions are sent from the microprocessor or any other remote computing device via a network.

* * * * *